US008959387B2

(12) United States Patent
Fasen et al.

(10) Patent No.: US 8,959,387 B2
(45) Date of Patent: Feb. 17, 2015

(54) TAPE DRIVE RETRY

(75) Inventors: Donald J. Fasen, Boise, ID (US); Vernon L. Knowles, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 219 days.

(21) Appl. No.: 13/562,852

(22) Filed: Jul. 31, 2012

(65) Prior Publication Data

US 2014/0040655 A1  Feb. 6, 2014

(51) Int. Cl.
  *G06F 11/07* (2006.01)
(52) U.S. Cl.
  USPC ............... 714/6.11; 714/16; 714/17; 714/18
(58) Field of Classification Search
  CPC .................................................. G06F 3/0682
  USPC ..................... 714/6.11, 16, 17, 18
  See application file for complete search history.

(56) References Cited

U.S. PATENT DOCUMENTS

| | | | |
|---|---|---|---|
| 3,984,814 A | 10/1976 | Bailey, Jr. et al. | |
| 4,549,295 A | 10/1985 | Purvis | |
| 4,752,846 A * | 6/1988 | Proehl | 360/72.2 |
| 4,783,784 A | 11/1988 | Ishiguro et al. | |
| 6,189,824 B1 * | 2/2001 | Stricker | 242/357 |
| 6,366,422 B1 | 4/2002 | Daniel et al. | |
| 6,600,616 B2 | 7/2003 | McAllister et al. | |
| 6,687,194 B1 | 2/2004 | Kobayashi et al. | |
| 6,937,425 B2 | 8/2005 | Knowles et al. | |
| 2002/0191321 A1 * | 12/2002 | Anderson | 360/60 |
| 2003/0131305 A1 * | 7/2003 | Taguchi et al. | 714/755 |
| 2004/0257694 A1 * | 12/2004 | Knowles et al. | 360/77.12 |
| 2005/0111131 A1 * | 5/2005 | Anderson et al. | 360/75 |
| 2007/0070870 A1 * | 3/2007 | Rothermel | 369/275.2 |
| 2008/0144211 A1 * | 6/2008 | Weber et al. | 360/77.12 |
| 2008/0239544 A1 * | 10/2008 | Saliba | 360/71 |
| 2009/0016186 A1 * | 1/2009 | Hata et al. | 369/72 |
| 2009/0040643 A1 * | 2/2009 | Weng et al. | 360/55 |
| 2009/0154005 A1 * | 6/2009 | Gage et al. | 360/77.14 |
| 2010/0033861 A1 * | 2/2010 | Fry et al. | 360/31 |
| 2010/0202083 A1 * | 8/2010 | Bui et al. | 360/78.02 |
| 2010/0265606 A1 * | 10/2010 | Thompson et al. | 360/15 |
| 2010/0265807 A1 * | 10/2010 | Thompson et al. | 369/53.41 |
| 2011/0170214 A1 * | 7/2011 | Bui et al. | 360/71 |
| 2011/0211273 A1 * | 9/2011 | Thompson | 360/55 |
| 2012/0239630 A1 * | 9/2012 | Wideman et al. | 707/692 |
| 2012/0287528 A1 * | 11/2012 | Thompson et al. | 360/48 |
| 2013/0258516 A1 * | 10/2013 | Katagiri et al. | 360/53 |

* cited by examiner

FOREIGN PATENT DOCUMENTS

| | | | |
|---|---|---|---|
| JP | 63169862 A | * | 7/1988 |
| JP | 2004348926 A | * | 12/2004 |

OTHER PUBLICATIONS

Zhe Zhang, et al., "Optimizing Center Performance through Coordinated Data Staging, Scheduling and Recovery," In Proceedings of the 2007 ACM/IEEE conference on Supercomputing (SC '07), Reno, Nevada, Nov. 10-16, 2007, ACM, New York, NY, USA, Article 55, 11 pp.

*Primary Examiner* — Chae Ko
(74) *Attorney, Agent, or Firm* — International IP Law Group, PLLC

(57) ABSTRACT

The present disclosure provides techniques for operating a tape drive. A method of operating a tape drive includes monitoring a parameter of the tape drive during a data access operation. The method also includes detecting an access failure. The method further includes selecting a treatment based on the parameter, applying the treatment, and performing a retry.

19 Claims, 4 Drawing Sheets

100

| Parameter | Condition | Treatment |
|---|---|---|
| Drag | Large Drag Force Indicated by High Motor Torque | Increase Tape Speed |
| Tape Speed Acceleration Error Rate | High ISV | Increase Tape Speed |
| PES Noise | High PES | Decrease Tape Speed |
| Acceleration Noise | High Vibration | Increase Tape Speed |
| Servo/Data AGC Level | High AGC Signal | Clean Heads |
| Tape Expansion | Tape is Contracted | Reduce Tape Tension |
| Tape Expansion | Tape is Expanded | Increase Tape Tension |
| Outer Element and Inner Element Error Rate | High Error Rate Margin, Tape is Contracted | Reduce Tape Tension |
| Outer Element and Inner Element Error Rate | High Error Rate Margin, Tape is Expanded | Increase Tape Tension |
| Data Timing Recovery Frequency Limit | High # of Errors | Widen Timing Recovery Frequency Limit |

TAPE DRIVE RETRY

BACKGROUND

Linear tape drives are widely used for computer backup and archiving. A linear tape drive includes a magnetic tape head that reads and writes magnetic tape linearly, such that data on the magnetic tape is read and/or written in sequence along the length of the magnetic tape. Multiple channels of data may be written to, and read from, the magnetic tape in parallel using multiple elements on the magnetic tape head. Occasionally, failures may occur when attempting to access the data on the tape. If a failure occurs, then the tape is repositioned and a retry is initiated in an attempt to access the data. Some retries may take as long as thirty seconds to perform, meaning that the data recovery process can be very time-consuming.

BRIEF DESCRIPTION OF THE DRAWINGS

Certain exemplary embodiments are described in the following detailed description and in reference to the drawings, in which:

FIG. 3 is a table showing examples of monitoring parameters of a tape drive with corresponding treatments.

DETAILED DESCRIPTION OF SPECIFIC EMBODIMENTS

Disclosed herein is a method and system to reduce data recovery time in a linear tape drive after a failure to access data occurs. As explained above, if a failure to access data occurs, then the tape can be repositioned and a retry initiated in an attempt to access the data. A retry, as used herein, is an attempt by the linear tape drive to access the data on a tape following a failure. Various treatments may be applied during the retries. A treatment, as used herein, is an alteration or adjustment to the operating conditions of the tape drive that may be applied during a retry to prevent the failure from occurring again. These treatments are often performed in a fixed sequential order with no consideration to what a cause of the failure may be. Because no consideration of the cause of the failure is given, a data recovery process may require multiple retries. Data recovery time can be reduced if tape drive parameters were evaluated to determine a selected treatment or specific order of treatments that can be used to prevent the failure.

Figure 1:
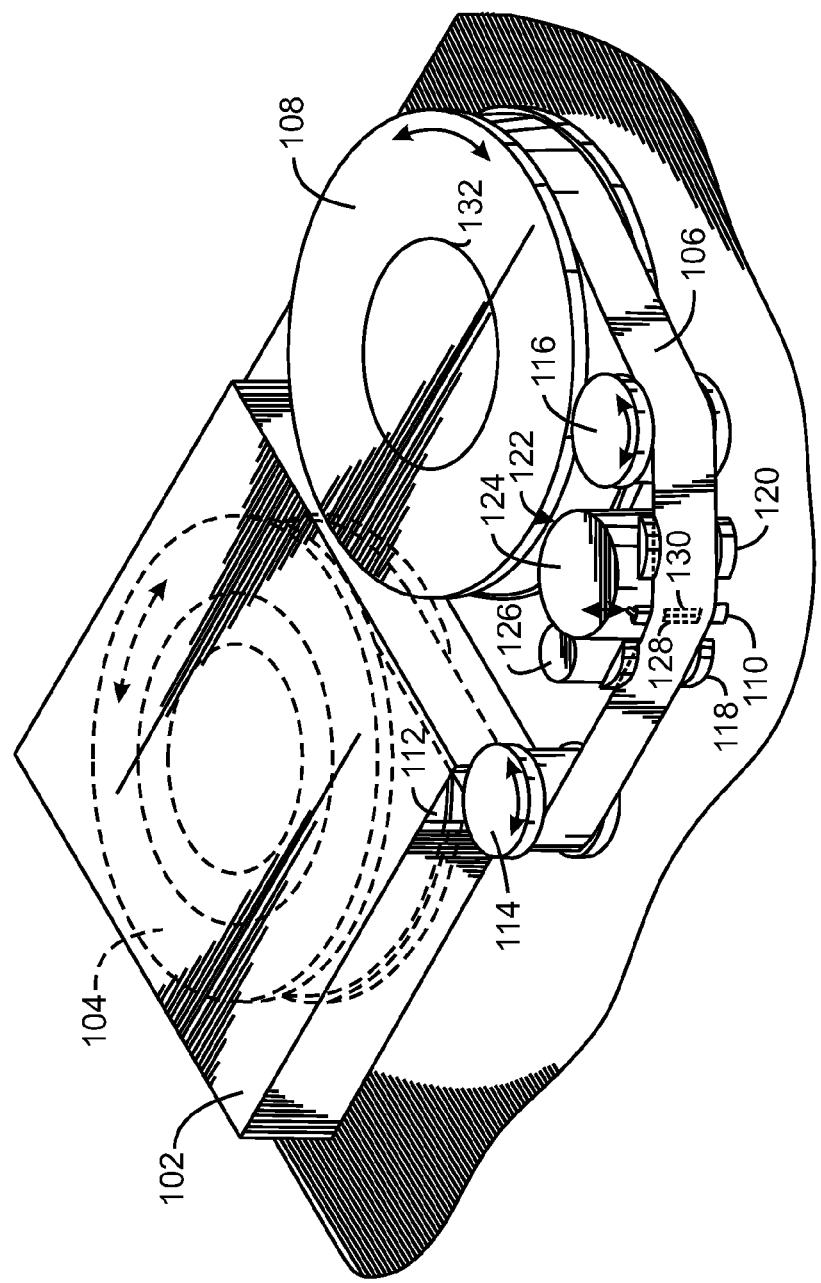
FIG. 1 is a perspective view of a linear tape drive.

FIG. 1 is a schematic of an internal operating configuration of a linear tape drive. The linear tape drive 100 may be configured to use tape cartridges such as a data tape cartridge 102. The data tape cartridge 102 may be a single-reel linear tape cartridge. The data tape cartridge 102 may include a magnetic tape carrier in the form of a reel 104 and magnetic tape 106 that is wound onto the reel 104. In addition, a second reel 108 may be included within the linear tape drive 100, which is configured to engage the magnetic tape 106. Thus, the second reel 108 works with the reel 104 to form a magnetic tape carrier. In other examples, the data tape cartridge 102, itself, includes two reels.

In some examples, the magnetic tape 106 is configured to have a width of approximately one-half inch. The magnetic tape 106 will also have a length extending in a direction perpendicular to the width, with a number of parallel tracks being defined across the width of the magnetic tape 106. Such tracks extend in the direction of the length of the magnetic tape 106, and are used to store data as well as servo information. The loading of the data tape cartridge 102 may be performed such that the magnetic tape 106 is positioned for linear movement along a magnetic tape head 110, or transducer head.

As shown in FIG. 1, the magnetic tape 106 exits the data tape cartridge 102 via an exit aperture 112. The magnetic tape 114 may then travel around roller guides 114 and 116, as well as stationary guides 118 and 120. The movement of the magnetic tape 106 may be such that tension is applied to the magnetic tape head 110 by the magnetic tape 106 during the normal operation of the linear tape drive 100.

The magnetic tape head 110 may be supported for up-and-down movement by a linear actuator 122. The linear actuator 122 is shown in FIG. 1 in a simplified form as a cylindrical body with an actuator housing 124. However, it is to be understood that the linear actuator 122 may be formed from any of a number of suitable configurations, wherein a linear-magnet displacement member enables movement of the magnetic tape head 110 to transverse the travel direction of the magnetic tape 114 in response to input from a controller 126.

The controller 126 may include computer-readable instructions, implemented in firmware for example, that are configured to direct the functioning of the hardware within the linear tape drive 100. For example, the controller 126 may direct the linear actuator 122 to effect the movement of the magnetic tape head 110. Such a movement of the magnetic tape head 110 may allow read and write sensing elements on the magnetic tape head 110 to be properly positioned onto tracks of data contained on the magnetic tape 106. Additionally, the controller 126 may select the interleaved data read elements from two sets of data read elements with different channel pitches. The magnetic tape head 110 may include a transducer that is configured to convert electrical data signals received from a computer or a network server, for example, to magnetic fluctuations that are contained within the magnetic tape 106, and vice versa. In various examples, the magnetic tape head 110 includes a number of data read elements (not shown) and data write elements (not shown) that are configured to read data from or write data to the magnetic tape 106, respectively. For example, the magnetic tape head 110 may include one or more write arrays 128 and one or more read arrays 130.

In various examples, the second reel 108, i.e., the reel that is built into the linear tape drive 100, includes a leader block assembly 132 including a number of leader pins (not shown). The leader block assembly 132 may enable the loading and unloading of the magnetic tape 106 during the loading and unloading of the data tape cartridge 102 within the linear tape drive 100. The leader block assembly 132 may be any suitable type of leader block assembly.

In examples, the controller 126 may be configured to monitor various parameters of the tape drive 100 while the tape drive is attempting to access the magnetic tape 106. As used herein the term parameter refers to any suitable characterization of the operating conditions of the tape drive. Furthermore, the term access is used herein to refer to any type of data access, including data write operations and data read operations. If an access failure occurs, the controller 126 can analyze the parameters to identify one or more treatments that have a high likelihood of remedying the problem that caused the access failure. For example, the controller 126 may select a treatment with the highest probability of remedying the problem. The controller 126 can then apply the treatment and perform a retry. Additionally, the controller 126 can identify two or more possible treatments and order the treatments sequentially in order of likelihood for remedying the problem. The controller 126 can then apply each treatment in the determined order for successive retries until the access is successful. Techniques for applying treatments and performing retries are described further below in relation to FIGS. 2 and 3.

It is to be understood that the linear tape drive 100 may include any number of additional components not shown in FIG. 1. In addition, any number of the components shown in FIG. 1 may not be included within the linear tape drive 100, depending on the specific application.

Figure 2:
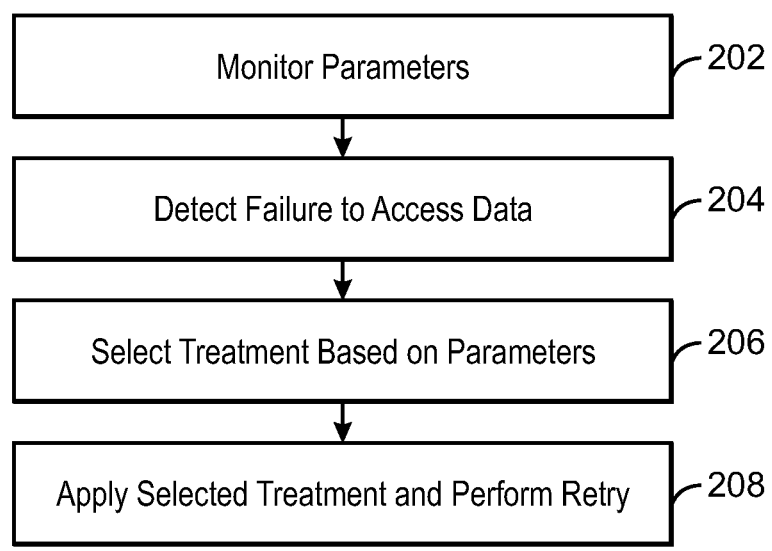
FIG. 2 is a process flow diagram of a method for accessing data in a tape drive.

FIG. 2 is a process flow diagram of a method to reduce data recovery time in the linear tape drive 100. The method 200 may be performed by the controller 126 (FIG. 1) as the tape drive attempts to access data on the magnetic tape 106. The method 200 evaluates parametric data while accessing data in order to determine an appropriate treatment in case of failure.

At block 202, the linear tape drive 100 may monitor any number of parameters as the linear tape drive 100 attempts to access the magnetic tape 106. The linear tape drive 100 may perform various techniques for tracking and measuring parametric data. Examples of parameters that can be monitored include drag force, tape speed acceleration errors, position error signal noise, acceleration noise, servo and data automatic gain control level, tape expansion, and data timing recovery frequency limit. The linear tape drive 100 may measure and track parametric data values and compare the data values against specified thresholds to determine whether the parameters are within acceptable ranges. In one example, the drag force parameter may be monitored by measuring the force (motor torque) used to move the magnetic tape 106 during data access. If the magnitude of the force exceeds a pre-defined threshold for force at any point in time, the parameter can be flagged. Any suitable number and type of parameters may be monitored during operation.

At block 204, the linear tape drive 100 may detect a failure to access the data. Upon failure, the linear tape drive 100 may evaluate the parametric data to identify potential causes for the access failure. Based on the monitored parameters, the tape drive 100 may identify multiple potential causes for the access failure. For example, excessive drag force could be identified as a possible cause for failure.

At block 206, the linear tape drive 100 may select a treatment based on the parameter data. In the above example, if the drag force was determined to be a potential source for the failure, then the treatment applied may involve running the magnetic tape 106 at a higher tape speed to prevent the failure.

If multiple potential causes of the access failure have been identified, then multiple potential treatments may be selected. In some cases, two or more parameters may point to the effectiveness of the same treatment. In other cases, two or more parameters may be in conflict, meaning that the parameters suggest effectiveness of different treatments or even opposite treatments. To select a specific treatment, an algorithm may be applied to the parameter data to resolve the conflict. For example, the treatments may be weighted according to the likelihood that the treatment will remedy the problem that caused the access failure. For example, treatments in which the parametric data show that the specified thresholds have been greatly exceeded may receive more weight than treatments in which the parametric data shows that the specified thresholds have been barely exceeded. Additionally, a voting scheme may be applied to select the treatment.

At block 208, the linear tape drive 100 may apply the selected treatment and perform a retry. For example, the linear tape drive 100 may attempt to access the magnetic tape 106 again, but at the higher speed. If the retry results in another access failure, the linear tape drive 100 may perform another retry, either at a higher tape speed, or with a different treatment altogether. For example, the tape drive 100 may select the next most likely treatment. If multiple potential treatments have been selected, then multiple retries are attempted, with each retry having a different treatment applied to it. The sequence in which the treatments are applied may be set so that more heavily weighted treatments are given priority over lightly weighted treatments. Examples of different types of monitored parameters and corresponding potential treatments are discussed further below in relation to FIG. 3.

FIG. 3 is a chart showing examples of parameters with corresponding treatments. For each parameter, data values are measured and tracked while the linear tape drive 100 attempts to access the magnetic tape 106. As shown in the table 300, each parameter is associated with a corresponding operating condition that may be in effect depending on the value of the parameter. In examples, the condition may be indicated if a data value for the corresponding parameter meets or exceeds a pre-defined threshold. If a condition for a parameter is met, a corresponding treatment may be selected and applied if an access failure occurs.

Parameter 302, referred to as drag, relates to a measure of force caused by friction between the magnetic tape 106 and the magnetic tape head 110. As the magnetic tape 106 is moved across the magnetic tape head 110, friction may cause the magnetic tape 106 to stick. This occurrence is known as stick-slip. Stick-slip may have detrimental effects such as worsened position or timing accuracy of data recovery. If a failure occurs while a linear tape drive 100 is attempting to access data, and the drag is measured to be higher than a pre-defined threshold value, then treatment for drag may be applied.

The treatment for a high value of drag is to run the magnetic tape 106 at a higher tape speed. Running the magnetic tape 106 at the higher tape speed may help prevent the magnetic tape 106 from sticking to the magnetic tape head 106. The linear tape drive 100 may employ a mechanism called Adaptive Tape Speed (ATS). Adaptive Tape Speed allows the linear tape drive 100 to vary the speed of the magnetic tape 106 to achieve the best match with host data rate. This might result in a low tape speed on slow hosts, which then can also lead to high drag under some environmental conditions. Consequently, it may be necessary to increase the tape speed during retries to help eliminate high drag at the expense of a compromise with matching host data rates. For example, the tape speed may be varied between 2 meters per second and 7 meters per second to match host data rate.

Parameter 304, referred to as tape speed acceleration error, relates to instantaneous speed variances (ISV) that may be caused by stick-slip. To measure the tape speed acceleration error, the linear tape drive 100 may be configured to emit a series of timed pulses. The linear tape drive 100 may determine tape speed at an instant by measuring how far the magnetic tape 106 moves between each timed pulse. Change in tape speed from one instant to another is acceleration, or instantaneous speed variance. A high magnitude for ISV may indicate stick-slip.

If a value for ISV exceeds a pre-defined threshold, a treatment may be applied. Similar to drag, the treatment for tape speed acceleration rate is increasing the tape speed so as to prevent stick-slip.

Parameter 306 is position error signal (PES) noise. Position error signal is a measure of how well the linear tape drive 100 is able to keep the magnetic tape 106 in its track while attempting to access data. A low value or a value of zero for PES may indicate that the magnetic tape head 110 is following the track on the magnetic tape 106 accurately, allowing the linear tape drive 100 to read or write data properly. A high value of PES may indicate that the magnetic tape 106 is not properly aligned with the magnetic tape head 110, and that the linear tape drive 100 may encounter errors while accessing the data.

High position error signal noise may be caused by lateral tape motion (LTM) of the magnetic tape 106 running at too high of a tape speed. LTM is generally worse at higher tape speeds than at lower tape speeds. Thus, a treatment may be to reduce the tape speed. It is understood that treatment for position error signal noise may come into conflict with treatment for parameters related to stick-slip, such as drag and tape speed acceleration error. If multiple treatments conflict with one another, a weighting algorithm may be used to either determine a compromising treatment, or an order of treatments that prioritize treatments based on likelihood of success. For example, in the scenario described above, the linear tape drive 100 may perform a retry in which the magnetic tape 106 is running at a medium tape speed that achieves a balance between the amount of both stick-slip and position error signal noise. In another example, a first treatment applied may be to increase tape speed, and if the retry is not successful, a second treatment applied may be to decrease tape speed.

Parameter 308, referred to as acceleration noise, relates to how well the linear tape drive 100 is at rejecting external vibration. The linear tape drive 100 may have an on-board accelerometer that can be used to cancel external shock and vibration. The amount of external vibration may be measured by the accelerometer. If the external vibration is excessive, treatment may be applied by increasing the tape speed of the magnetic tape 106.

The effectiveness of the accelerometer at canceling external shock and vibration may be related to how frequently information regarding the position of the magnetic tape 106 is updated. The linear tape drive 100 reads the position of the magnetic tape 106 while accessing data. Increasing tape speed would directly increase the update rate of tape position information. In turn, increasing the update rate of tape position information would improve the ability of the accelerometer to counteract external vibration.

Parameter 310 is servo/data automatic gain control (AGC) level. Automatic gain control relates to the gain, or amplification, applied to the signal received by the magnetic tape head 110 to access information on the magnetic tape 106. The magnetic tape head 110 may contain a number of data and servo elements to read information off of the magnetic tape 106 as voltage signals.

During data recovery, dust and debris collected by the linear tape drive 100 may cause the signal received by the magnetic tape head 110 to be reduced, resulting in a higher AGC level. The debris may be created as a result of certain environmental conditions or types of magnetic tape 106. The debris may form directly on the magnetic tape head 110 and block the data and servo elements from reading data off the magnetic tape 106. A high AGC level may indicate that the magnetic tape head 110 is dirty.

The treatment for missing automatic gain control would be to clean the magnetic tape head 110 prior to performing a retry. The linear tape drive 100 may include an automated cleaning process that is configured to remove debris from the magnetic tape head 110. In a scenario where multiple treatments are to be performed, the cleaning of the magnetic tape head 110 may be performed before other treatments.

Parameter 312, referred to as tape expansion, relates to the change in dimensions that a magnetic tape 106 may experience during data recovery. Changes in the expansion of the magnetic tape 106 may make it difficult for the magnetic tape head 110 to read data off the magnetic tape 106 properly. Data head elements located towards the outer edges of the magnetic head 110 may not be on track and may misread the tracks on the magnetic tape 106. Changes in the expansion of the magnetic tape may be caused, for example, by humidity, temperature or excessive tension applied to the tape, among others.

The expansion of the tape 106 can be measured by the servo elements on magnetic tape head 110. The servo elements may track the position of the upper and lower servo bands on the magnetic tape 106 to calculate the expansion.

The corresponding treatment for tape expansion is to adjust the tape tension. The linear tape drive 100 may be configured so that the tape tension can be adjusted while accessing data. If the width of the magnetic tape 106 is small compared to the known width, the tape tension is reduced. If the width of the magnetic tape 106 is large compared to the known width, the tape tension is increased. The degree to which the tape tension is increased or reduced may depend on measured expansion of the magnetic tape 106.

Parameter 314, referred to as outer element and inner element error rate, relates to the error rates detected when accessing outer elements of the magnetic tape head 110. The outer element and inner element error rate may be affected by changes in the expansion of the magnetic tape 106. Changes in the expansion of the magnetic tape 106 may cause errors in reading from outer-channels, or data channels located nearer the edge of the magnetic tape 106. These errors are the result of the outer-channels not being properly aligned with data and servo elements of the magnetic tape head 110.

A change in tape expansion may be detected by monitoring the average error rate for the outer-channels relative to data channels located near the middle of the magnetic tape head 110, or mid-channels. If the outer-channel error rate is larger than the mid-channel error rate by a certain margin, then the tape expansion has changed and treatment may be required. Parameter 314 may be monitored in conjunction with parameter 312 (tape expansions) to determine whether the tape is expanded or contracted. If the tape is contracted the treatment applied may be to reduce the tape tension. If the tape is expanded, then the treatment applied may be to increase tape tension.

Parameter 316, referred to as data timing recovery frequency limit, relates to how much information per length of magnetic tape 106 that the magnetic tape head 110 is configured to read during data recovery. The range of timing recovery frequencies may be limited so that the magnetic tape head 110 does not falsely lock onto data bits that are intended to be out of range, or are not meant to be read at all.

The magnetic tape 106 may have data written at a data density that does not correspond with the timing recovery frequency range of the linear tape drive 100. If the data density and the timing recovery frequency range do not match, the linear tape drive 100 may experience a number of errors during data recovery. The linear tape drive 100 may flag errors related to timing recovery frequency. The treatment for failure related to timing recovery frequency may be to widen or shift the timing recovery frequency limit so that the limit or range encompasses the data density of the magnetic tape 106.

It is to be understood the parameters discussed above are not the only examples of parameters that may be monitored.

Other parameters that may be monitored may include initial position error signal noise, tracking offsets, stability, and tilt. Additionally, other treatments may exist as well, for both parameters discussed herein and parameters not discussed herein.

Figure 4:
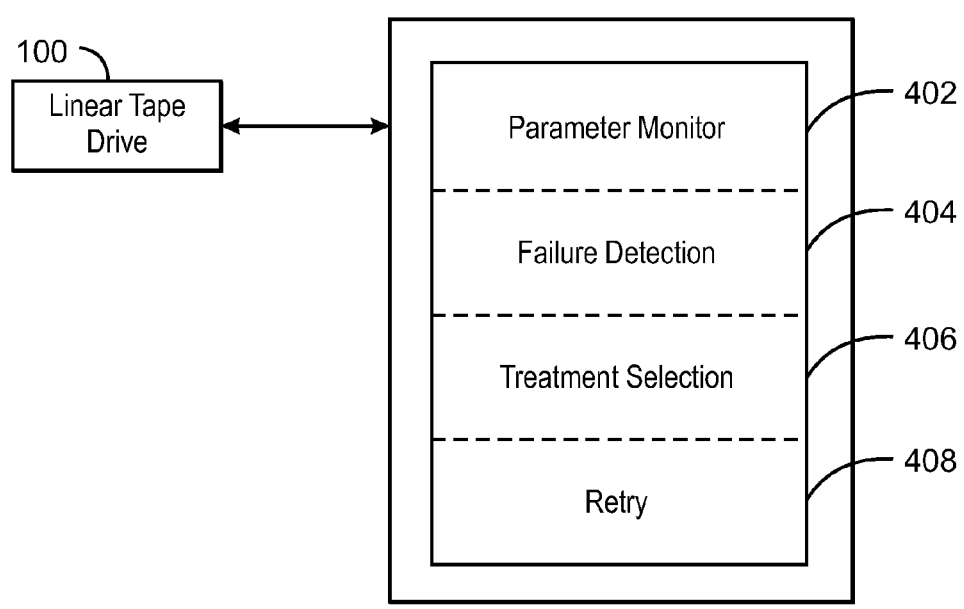
FIG. 4 is a block diagram of a tangible, computer-readable medium containing instructions for accessing data in a tape drive.

FIG. 4 is a block diagram of a tangible, non-transitory computer-readable medium containing instructions to direct a tape drive to reduce data recovery time. The tangible, computer-readable medium is referred to by the reference number 400. The tangible, computer-readable medium may be configured to instruct the linear tape drive 100 to perform functions for reducing data recovery time after a failure.

As shown in FIG. 4, the various components discussed herein can be stored on the tangible, computer-readable medium 400. A first region 402 on the tangible, computer-readable medium 400 can include instructions for monitoring a parameter. Parametric data can be measured and tracked. A region 404 can include instructions for failure detection. If a failure is detected, the parametric data is examined to see if certain pre-defined thresholds for certain parameters have been exceeded. If so, the failure may have resulted from one of the parameters in which a pre-defined threshold has been exceeded. A region 406 can include instructions for treatment selection. One or more treatments can be selected based on the parameters whose pre-defined thresholds have been exceeded. If multiple treatments have been selected, a weighting algorithm may be used to prioritize the sequence in which the treatments are applied, or create a compromising treatment for treatments in direct conflict. A region 408 can includes instructions to apply the treatment and perform the retry. Depending on the type and number of treatments selected, multiple retries may be performed.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. A method of operating a tape drive, comprising:
monitoring a parameter of the tape drive during a data access operation, wherein the parameter is related to a characteristic of the tape drive, and wherein the parameter is a data timing recovery frequency limit;
detecting an access failure of the tape drive;
identifying a cause of the access failure based on the monitored parameter;
selecting a treatment based on the cause of the access failure, wherein the treatment is to widen or shift the data timing recovery frequency limit;
applying the treatment; and
performing a retry.

2. The method of claim 1, comprising:
monitoring a first parameter and a second parameter;
selecting a first treatment based on the first parameter, and a second treatment based on the second parameter; and
determining a sequential ordering of the first treatment and the second treatment to use for a series of retries based on a likelihood that the corresponding treatment will correct the cause of the access failure.

3. The method of claim 1, wherein the parameter is drag, and the treatment is to increase tape speed.

4. The method of claim 1, wherein the parameter is tape speed acceleration, and the treatment is to increase tape speed.

5. The method of claim 1, wherein the parameter is PES noise, and the treatment is to reduce tape speed.

6. The method of claim 1, wherein the parameter is acceleration noise, and the treatment is to increase tape speed.

7. The method of claim 1, wherein the parameter is servo/data AGC level and the treatment is to clean a tape head of the tape drive.

8. The method of claim 1, wherein the parameter is tape expansion and the treatment is to increase or reduce tape tension.

9. The method of claim 1, wherein the parameter is outer element and inner element error rate margin, and the treatment is to increase or reduce tape tension.

10. A tape drive, comprising:
a controller configured to:
monitor a parameter of the tape drive during a data access operation, wherein the parameter is related to a characteristic of the tape drive, and wherein the parameter is a data timing recovery frequency limit;
detect a data access failure;
identify a cause of the data access failure based on the monitored parameter;
select a treatment based on the cause of the data access failure, wherein the treatment is to widen or shift the data timing recovery frequency limit; and
apply the treatment and perform a retry.

11. The tape drive of claim 10, wherein the controller is configured to monitor a first parameter and a second parameter, select a first treatment based on the first parameter, select a second treatment based on the second parameter, and determine a sequential ordering of the first treatment and the second treatment to use for a series of retries based a likelihood that the corresponding treatment will remedy the cause of the access failure.

12. The tape drive of claim 10, wherein the controller is configured to monitor the parameter by measuring external vibration with an accelerometer.

13. The tape drive of claim 10, wherein the controller is configured to monitor the parameter by measuring instantaneous speed variances of a tape.

14. The tape drive of claim 10, wherein the controller is configured to monitor the parameter by tracking a position of a tape.

15. The tape drive of claim 10, wherein the controller is configured to apply the treatment by varying tape speed.

16. The tape drive of claim 10, wherein the controller is configured to apply the treatment by varying tape tension.

17. The tape drive of claim 10, wherein the controller is configured to apply the treatment by instructing a cleaning apparatus to clean a tape head of debris.

18. A tangible, non-transitory, computer-readable medium, comprising instructions to direct a tape drive to:
monitor a parameter of the tape drive during a data access operation, wherein the parameter is related to a characteristic of the tape drive, and wherein the parameter is a data timing recovery frequency limit;
detect a data access failure;
identify a cause of the data access failure based on the monitored parameter;
select a treatment based on the cause of the data access failure, wherein the treatment is to widen or shift the data timing recovery frequency limit; and
apply the treatment and perform a retry.

19. The tangible, non-transitory, computer-readable medium of claim 18, comprising instructions to direct a tape drive to:
monitor a first parameter and a second parameter;

select a first treatment based on the first parameter, and a second treatment based on the second parameter; and determine a sequential ordering of the first treatment and the second treatment to use for a series of retries based on a likelihood that the corresponding treatment will remedy the cause of the access failure.

\* \* \* \* \*